United States Patent [19]

Clark

[11] Patent Number: 5,079,758

[45] Date of Patent: Jan. 7, 1992

[54] SINGLE POLYMER LAYER RECORDABLE/ERASABLE OPTICAL MEDIA

[75] Inventor: Bryan K. Clark, Sunnyvale, Calif.

[73] Assignee: Tandy Corporation, Fort Worth, Tex.

[21] Appl. No.: 414,041

[22] Filed: Sep. 28, 1989

[51] Int. Cl.⁵ .............. G11B 7/24; G11B 7/26; G01D 15/34

[52] U.S. Cl. .................. 369/284; 369/283; 369/286; 369/275.2; 346/135.1; 346/76 L; 365/120; 365/126; 430/945

[58] Field of Search ............. 369/280, 282, 283, 284, 369/286, 288, 275.3, 275.4; 346/135.1; 365/124, 126, 127

[56] References Cited

U.S. PATENT DOCUMENTS

| | | | |
|---|---|---|---|
| 3,607,134 | 9/1971 | McIntyre | 206/446 X |
| 4,278,734 | 7/1981 | Ohta et al. | 365/127 X |
| 4,360,895 | 11/1982 | Cornet | 365/126 X |
| 4,371,954 | 2/1983 | Cornet | 365/126 |
| 4,398,203 | 8/1983 | Cornet | 346/135.1 |
| 4,404,656 | 9/1983 | Cornet | 365/126 |
| 4,430,659 | 2/1984 | Maffitt et al. | 346/135.1 |
| 4,527,173 | 7/1985 | Gupta et al. | 346/135.1 |
| 4,578,788 | 3/1986 | Ahn et al. | 369/275 |
| 4,645,712 | 2/1987 | Ishigaki et al. | 428/433 |
| 4,651,172 | 3/1987 | Watanabe et al. | 346/135.1 |
| 4,673,626 | 6/1987 | Takeda et al. | 430/14 |
| 4,680,458 | 7/1987 | Drexler | 235/487 |
| 4,709,363 | 11/1987 | Dirks et al. | 369/275 |
| 4,710,452 | 12/1987 | Raychaudhuri | 430/495 |
| 4,719,615 | 1/1988 | Feyrer et al. | 369/284 |
| 4,773,059 | 9/1988 | Minemura et al. | 369/100 |
| 4,780,867 | 10/1988 | Lind et al. | 369/100 |
| 4,798,785 | 1/1989 | Pan et al. | 430/495 |
| 4,825,430 | 4/1989 | Halter et al. | 369/275 |
| 4,852,075 | 7/1989 | Feyrer et al. | 369/100 |
| 4,852,077 | 7/1989 | Clark et al. | 369/284 |
| 4,879,709 | 11/1989 | Clark | 369/284 |
| 4,896,314 | 1/1990 | Skiens et al. | 369/284 |

FOREIGN PATENT DOCUMENTS

| | | |
|---|---|---|
| 1229410 | 11/1987 | Canada . |
| 0136070 | 4/1985 | European Pat. Off. . |
| 0263641 | 4/1988 | European Pat. Off. . |
| 0338776 | 10/1989 | European Pat. Off. . |

OTHER PUBLICATIONS

Watkinson, The Art of Digital Audio, Chapter 13, pp. 440–486, Focal Press (1988).
Sales Materials, Indalloy (1989).
Hartman et al., "Erasable Bilayer Dye-Polymer Optical Recording Medium".
Miyaoka, "Digital Audio Is Compact and Rugged," IEEE Spectrum (Mar. 1984), pp. 35–39.

Primary Examiner—Stuart S. Levy
Assistant Examiner—Kenneth B. Wells
Attorney, Agent, or Firm—Townsend and Townsend

[57] ABSTRACT

Recordable/erasable optical storage media are disclosed. More particularly, it provides a method and apparatus for recording and erasing information on an optical storage medium. The medium of the present invention generally includes a rigid substrate and an active region or layer adjacent to the substrate. The active region is a single polymer layer that functions as both an expansion layer and a retention layer. Reflective and protective layers may or may not be present. Additionally, methods for writing and erasing on these media are described.

10 Claims, 2 Drawing Sheets

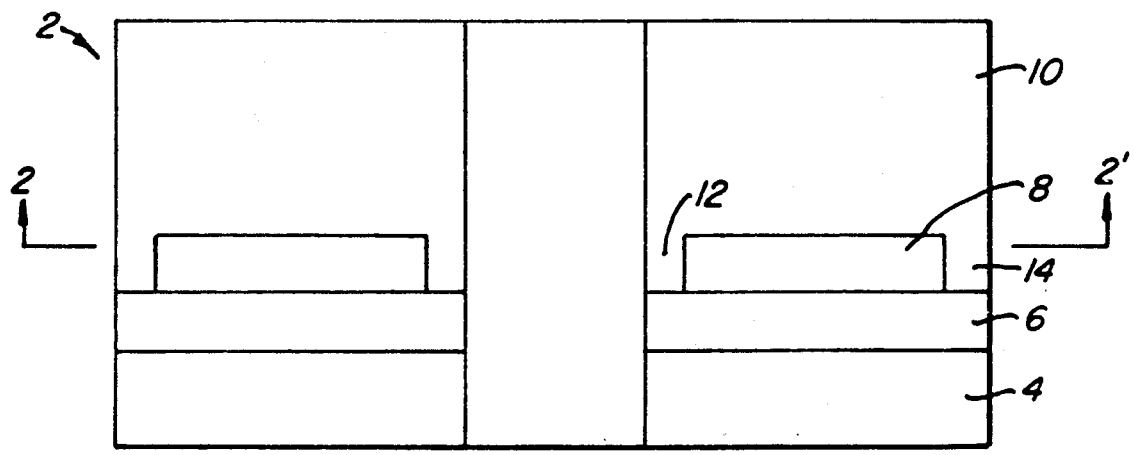
FIG._1.
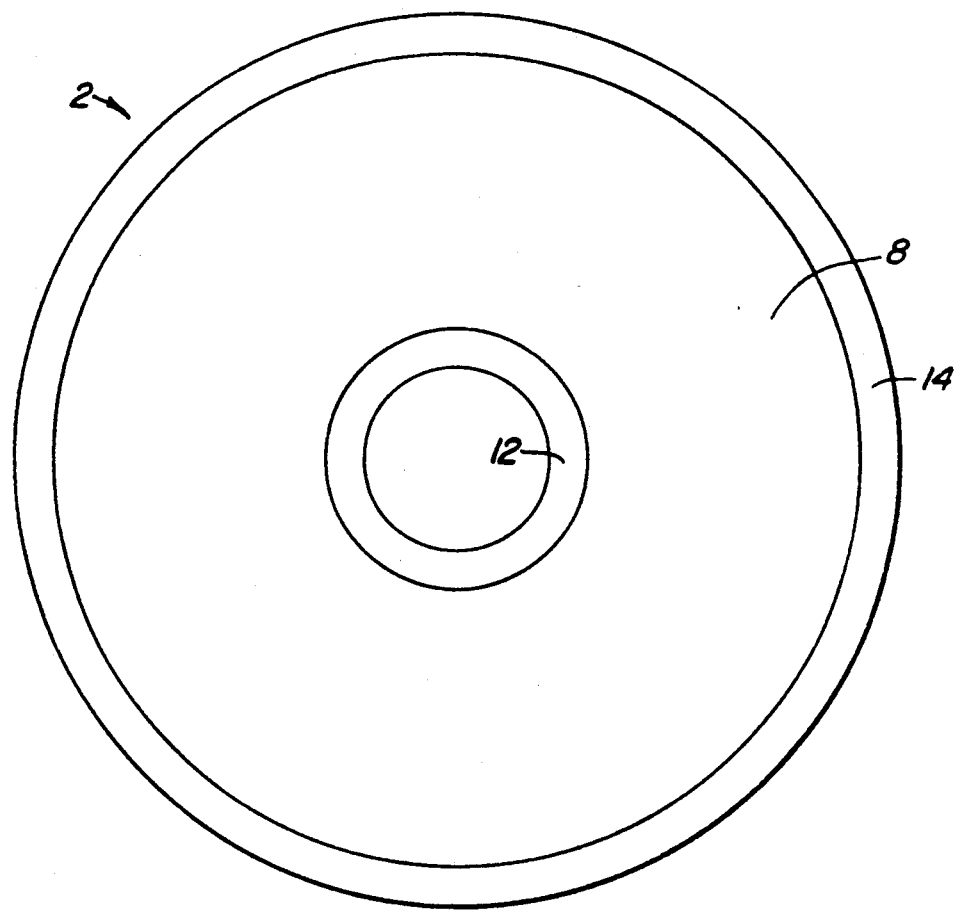
FIG._2.

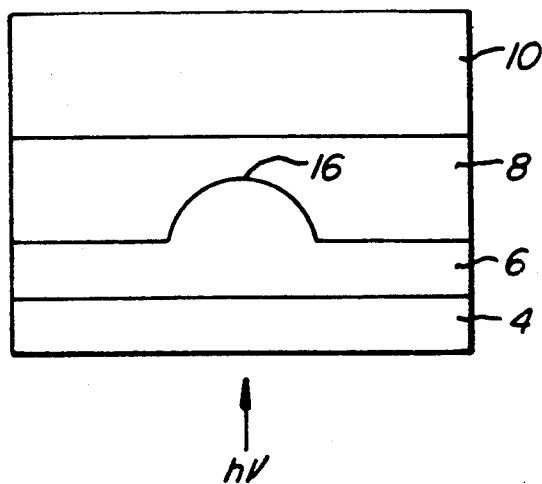
FIG._3.
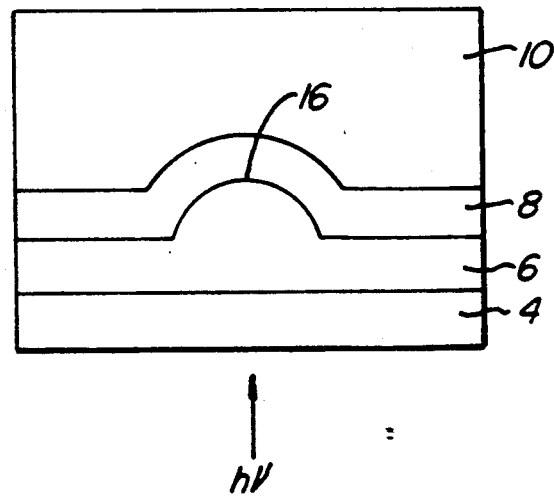
FIG._4.
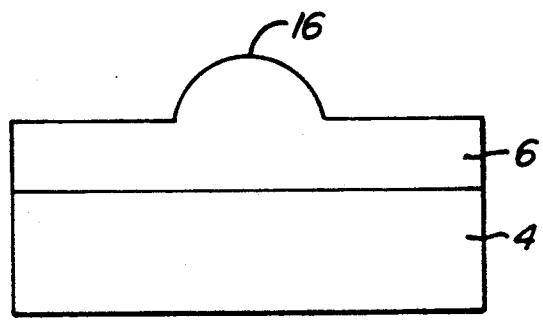
FIG._5.

SINGLE POLYMER LAYER RECORDABLE/ERASABLE OPTICAL MEDIA

BACKGROUND OF THE INVENTION

1. Field of the Invention

The present invention relates in general to the field of recording media. In particular, this invention provides a recordable/erasable optical storage medium with a single polymer layer and write/read/erase mechanism therefor in which data may be recorded and erased in response to thermal effects and, in particular, in response to light.

2. Description of the Related Art

Optical data storage media in the form of compact disks are well known as an alternative to long-playing records and magnetic tape cassettes. The disks with which consumers are familiar are optical read-only disks, and the common disk player is designed specifically for this type of disk. These disks have a reflective surface containing pits that represent data in binary form. A description of these pits and how they function is provided by Watkinson, "The Art of Digital Audio," Focal Press, Chapter 13.

Compact disks are currently produced by a pressing process similar to the process used to produce conventional long-playing records. The process, referred to herein as the mastering process, starts by first polishing a plain glass optical disk. This disk has an outside diameter from 200 to 240 mm, a thickness of 6 mm and undergoes various cleaning and washing steps. The disk is then coated with a thin chrome film or coupling agent, a step taken to produce adhesion between the glass disk and a layer of photo-resist, which is a photosensitive material. Data on a compact disk master tape are then transferred to the glass disk by a laser beam cutting method.

The glass disk is still completely flat after it is written on by the laser beam because pits are not formed until the glass is photographically developed. The disk surface is first made electrically conductive and then subjected to a nickel evaporation process. The disk, now know as the glass master, then undergoes nickel electrocasting, a process that is similar to that used in making analog phono records. A series of metal replications follow, resulting in a disk called a stamper. The stamper is equivalent to a photographic negative in the sense that it is a reverse of the final compact disk; that is, there are now bumps where there should be pits. This stamper is then used to make a pressing on a transparent polymer such as polyvinyl chloride, poly(ethyl-methacrylate), and polycarbonate. The stamped surface is then plated with a reflective film, such as aluminum or other metal, and finally a plastic coating is applied over the film to form a rigid structure.

The player operates by focusing a laser beam on the reflective metal through the substrate and then detecting reflected light. The optical properties of the substrate, such as its thickness and index of refraction, are thus critical to the player's detection systems and standard players are designed specifically with these parameters in mind.

The pits increase the optical path of the laser beam by an amount equivalent to a half wavelength, thereby producing destructive interference when combined with other (non-shifted) reflected beams. The presence of data takes the form of a drop in intensity of the reflected light. The detection system on a standard player is designed to require greater than 70% reflection when no destructive interference occurs and a modulation amplitude greater than 30% when data is present. These intensity limits, combined with the focusing parameters, set the criteria for the compact disks and other optical data storage media that can be read or played on such players.

Media on which data can be recorded directly on, and read directly from, have a different configuration and operate under a somewhat different principle. One example is described in U.S. Pat. No. 4,719,615 (Freyrer, et al.).

The medium described in Feyrer, et al., includes a lower expansion layer of a rubbery material that expands when heated. The expansion layer is coupled to an upper retention layer that is glassy at ambient temperature and becomes rubbery when heated. Both layers are supported on a rigid substrate. The expansion and retention layers each contain dyes for absorption of light at different wavelengths. Data are recorded by heating the expansion layer by absorption of light from a laser beam at a "record" wavelength to cause the expansion layer to expand away from the substrate and form a protrusion or "bump" extending into the retention layer. While this is occurring, the retention layer rises in temperature above its glass transition temperature so that it can deform to accommodate the bump. The beam is then turned off and the retention layer cools quickly to its glassy state before the bump levels out, thereby fixing the bump.

Reading or playback of the data is then achieved by a low intensity "read" beam that is focused on the partially reflecting interface between the retention layer and air. When the read beam encounters the bump, some of the reflected light is scattered, while other portions of the reflected light destructively interfere with reflected light from non-bump areas. The resulting drop in intensity is registered by the detector. Removal of the bump to erase the data is achieved by a second laser beam at an "erase" wavelength that is absorbed by the retention layer and not by the expansion layer. This beam heats the retention layer alone to a rubbery state where its viscoelastic forces and those of the expansion layer return it to its original flat configuration. The write, read, and erase beams all enter the medium on the retention layer side, passing through retention layer before reaching the expansion layer.

The erasable optical storage medium system described in Feyrer, et al., has a number of disadvantages. For example, the writing and erasure of data must be performed at two different wavelengths of light. Furthermore, the device relies on reflection at the interface between the retention layer and air that results in an inherently low reflectivity (30% maximum) Thus, the system cannot be read by the detection mechanism of a standard compact disk player designed for focusing through a 1.2 mm polycarbonate substrate and requiring 70% reflectance. Additionally, there is either a predetermined level of thermal conductivity between the heated expansion layer, to sufficiently raise the temperature of the retention layer so that it can accommodate the bump formed by the expansion layer, or the retention layer must absorb a predetermined amount of light energy at the "record" wavelength, in order to produce the needed temperature rise in the retention layer during recording. In either case, this requirement must be met and accurately controlled if this media is to be produced with consistent recording characteristics.

In addition, in order for the most effective erasure to be achieved, the retention layer must be heated separately from the expansion layer. This follows from the fact that during erasure the retention layer must reach a rubbery state in order for the viscoelastic forces of a cool expansion layer to pull the expansion layer back to its original flat configuration. If the expansion layer is heated during this time, it will not be in its relaxed state and it will therefore not return to its flat configuration. Because the expansion layer and the retention layers are in intimate physical contact, heat energy must be conducted between the two layers during both the recordation and erase processes, thus negating the possibility of only heating the retention layer. Any attempt to erase the medium during the act of recordation, i.e., direct overwrite data update, therefore would prove unsuccessful.

Copending application Ser. No. 294,723 (assigned to the assignee of the present application) describes an improved optical recording method and apparatus. In one embodiment, the invention includes an expansion layer, a reflective layer, and a retention layer. As the expansion layer is heated it expands, pressing into the thin reflective layer, the retention layer, and a protective layer. In an alternative embodiment, the retention layer is provided between the reflective and expansion layers. The retention layer is pressed into, for example, the protective layer that is sufficiently compliant to allow deformations. The reflective layer is described as being, for example, gallium, aluminum, copper, silver, gold, or indium.

In one embodiment, copending application Ser. No. 357,377 (assigned to the assignee of the present application) describes a liquid reflective layer that is provided adjacent the retention layer opposite the expansion layer. Additionally, improved expansion and retention layers are also described therein.

Optical media described above have one or more limitations. First, two lasers are normally necessary, one for the expansion layer and a second one for the retention layer. These lasers often require individual wavelengths: a "recording laser" emitting a beam with a wavelength corresponding to the absorption frequency of a dye in the expansion layer and an "erasing laser" emitting a beam with a wavelength corresponding to the absorption frequency of a dye in the retention layer. Second, manufacture of these media requires several separate coating operations, thereby increasing the risk of defects due to coating flaws, dust and handling, for example. Also, the manufacturing cost is increased with each additional coating operation.

A purpose of the present invention is to overcome these limitations and to provide recordable/erasable storage media requiring but a single laser for recordation and erasure and also one less coating operation.

SUMMARY OF THE INVENTION

The present invention provides recordable/erasable optical storage media. More particularly, it provides a method and apparatus for recording and erasing information on an optical storage medium. The medium of the present invention generally includes a rigid substrate and an active region or layer adjacent to the substrate. A reflective layer adjacent to the active layer is optionally present. Additionally, a protective layer is optionally present and is adjacent to the reflective layer, or alternatively adjacent to the active layer if a reflective layer is not present.

Functions of the expansion and retention layers of the prior art media are combined in this invention into a single polymer layer, the active layer. The mechanism by which this active layer functions is a result of a thermal gradient created within the active layer, as well as of the viscoelastic properties of the material of the layer.

The media of the invention are susceptible to expansion and relaxation, to writing data thermally, to erasing data thermally, and to reading data optically.

Methods for writing and erasing on the media of the present invention are also disclosed.

BRIEF DESCRIPTION OF THE DRAWINGS

FIG. 1 is a cross-section of a recording medium illustrating one embodiment of the present invention.

FIG. 2 illustrates a top view along line 2—2' of the medium shown in FIG. 1.

FIG. 3 illustrates an alternative embodiment of the recording medium of the invention, in cross-section and including data recorded thereon in the form of a recordation bump.

FIG. 4 illustrates a second alternative embodiment of the recording medium of the invention, in cross-section and including data recorded thereon in the form of a recordation bump.

FIG. 5 illustrates a third alternative embodiment of the recording medium of the invention.

DETAILED DESCRIPTION OF THE INVENTION AND PREFERRED EMBODIMENTS

The present invention provides recordable/erasable optical storage media. FIGS. 1 and 2 illustrate one embodiment of the invention as it applies to a disk 2. In FIG. 1, the disk includes a substrate 4 onto which an active layer or region 6 is provided. A reflective layer 8 may be present, although it is not necessary. A protective layer 10 may also be present, although it is not necessary. FIG. 5 illustrates an alternative embodiment where the reflective layer 8 and the protective layer 10 are absent. If a reflective layer and a protective layer are both present, the protective layer will be adjacent the reflective layer and will retain the material against the active layer. In one embodiment, as shown in FIG. 1, the protective layer will enclose and contain the reflective layer, this being accomplished by the protective layer being provided with an inner ring 12 and an outer ring 14 that extend to and contact the active layer 6. Alternatively, as shown in FIG. 3, the reflective layer 8 may extend to the edges of the disk so that the protective layer 10 does not contain it. FIGS. 3 and 4 illustrate the invention in greater detail with a recorded "bump" 16.

The substrate 4 is formed from a rigid transparent material that permits substantially full transmission of light for recordation, reading, and erasure. The substrate is sufficiently thick and rigid to provide structural integrity to the optical medium, and it does not deform in response to pressure caused by expansive forces in the adjacent active layer. Recordation bumps in the active layer, caused by its thermal expansion upon absorption of the write beam's light energy, protrude away from the substrate because of its rigidity. With this layer arrangement, the bumps protrude into the reflective layer, if present, as described below.

The substrate may be constructed from a wide variety of readily available materials. Merely by way of example, the substrate can be fabricated from glass, polymers, and amorphous polymers. In a preferred embodiment, the substrate is made of polycarbonate. In many embodiments, the substrate will be the thickest layer, with a thickness of about 1 mm or more.

Adjacent to the substrate is a single polymer layer, termed the "active" region or layer 6, which alleviates the need for separate expansion and retention layers. As described below, both recording and erasure thus can be accomplished with a single laser beam. Additionally, there is necessarily one less separate coating operation involved in the manufacture of a medium of the present invention.

The active layer is comprised of any polymer whose softening temperature is above room temperature (20° C.) and which has a relatively large coefficient of expansion above its softening temperature. By "softening temperature" is meant the temperature at which the modulus of elasticity of the material of the active layer has dropped to 25% to 50% of its room temperature or maximum modulus. A softening temperature range of approximately 30° C.–175° C. is preferred, with a more preferred range of approximately 90° C.–130° C. The coefficient of expansion should be greater than $200 \times 10^{-6}/°C.$, and is preferably greater than $250 \times 10^{-6}/°C.$, more preferably greater than $300 \times 10^{-6}/°C.$ The active layer material may comprise a base resin selected from the group consisting of epoxys, polyurethane, polymers, amorphous polymers, cellulose acetate, cellulose acetate-butyrate, polystyrene, polysulfonamide, polycarbonate, cellulose nitrate, poly(ethylmethacrylate), poly(vinyl butyryl), aromatic polyesters, polyamides, acrylic polymers, polyvinyl acetate, silicone resins, alkyd resins, styrene-butadiene copolymers, vinyl chloride-vinyl acetate copolymers, nitrocellulose, ethylcellulose, and mixtures thereof. In a preferred embodiment, the active layer is an epoxy with a softening temperature of about 80° C. to 120° C. and may be, for example, about 105° C.

In more preferred embodiments, a base resin or mixture of resins may be mixed with appropriate curing agents to form the active layer or region. In particular, a bisphenol A/-epichlorohydrin epoxy resin (Shell 828, manufactured by Shell Chemical) and an epichlorohydrin-dimer fatty acid-based epoxy resin (Shell 871, manufactured by Shell Chemical) may be mixed in approximately equal amounts with a nonstoichiometric (e.g., 2.6×) amount of a curing agent, such as Versamid V150 (a polyamide resin which is an adduct of a polyamine with a dibasic fatty acid, manufactured by Henkel). Additionally, Shell 828 may be mixed with a nonstoichiometric (e.g., 1.5×) amount of a curing agent such as Dow DEH52 (an aliphatic polyamine-epoxy adduct, manufactured by Dow Chemical).

The thickness of the active layer is approximately 0.5 to 3.0 microns. A preferred range is 1.0 to 2.0 microns. The active layer is bonded to the substrate and the reflective layer, if the latter is present. This is achieved by methods known in the art. For example, coating of the active layer onto the substrate may be accomplished by a wet chemical process, such as spin coating or web coating. The reflective layer is then deposited onto the active layer. The reflective layer deposition process will depend on what material is chosen for the layer. For example, a die layer would use a wet chemical process such as spin coating. A metal layer would use vacuum deposition or sputtering. Other types of polymers may use plasma deposition. All of these coating processes are known in the art.

A reflective layer 8 may or may not be adjacent to the active layer. This reflective layer serves to reflect light back through the active layer for purposes of recordation and data detection. In one embodiment of the invention, this layer is highly reflective, preferably reflecting at least about 70% of the light striking it during both recordation and reading. The reflective layer is also deformable so that it conforms to the shape of the recordation bumps, which represent the recorded data for purposes of light scattering. The material of the reflective layer should not unduly constrict bump formation and should not become substantially work hardened over the number of desired write and erase cycles. Also, the material of the reflective layer should have insufficient strength to hold the deformations when the active layer returns to its original relaxed, non-deformed state.

The reflective layer described above can be an elemental metal, a metal alloy or other reflective material that is soft at room temperature, and softens or melts, or both, to be deformable near or below the temperature reached by the active layer during recordation. In a preferred embodiment, it is also highly reflective. Pure indium yields favorable results; however, in some cases, the large grain structure of indium produces less than optimal results such as noise during playback. When indium is combined with other materials, a finer grain structure results and the noise is either reduced or eliminated. A preferred combination is indium plus bismuth, reducing the melting point from 156° C. to approximately 80° C. Also useful are alloys, particularly eutectic alloys of bismuth or indium, and more particularly a eutectic alloy of bismuth with other metals such as, for example, tin, cadmium, or indium. Such alloys will result in a melting point within the desired range of substantially below the softening temperature of the layer. In an alternative embodiment, the layer is a material with insulating properties or insulating and reflective properties.

Depending on the thickness of the reflective layer, the recordation bumps formed in the active layer and protruding into the reflective layer may or may not protrude into a protective layer, if such layer is present. Thus, when the reflective layer is relatively thin, it is deformed out by the bump extending from the active layer through the reflective layer to its outer surface. This is illustrated in FIG. 4. However, when the reflective layer is a relatively thick layer, the bump extending from the active layer deforms into the reflective layer, but the layer encompasses the deformation so that it does not transmit through the layer to its outer surface. This is illustrated in FIG. 3.

A protective layer 10 may be present which serves to protect the recordation bumps from damage due to contact with external objects. Characteristic of this layer is that it be sufficiently compliant to allow the deformations or bumps in the active layer to easily protrude into it and thereby offer little resistance to their formation. In addition, the protective layer preferably is relatively thick when compared to the active and reflective layers so that the bumps are not transmitted through the reflective layer, into the protective layer and subsequently through the protective layer to its outer surface. This characteristic is illustrated in FIG. 4.

It is also preferred, although not necessary, that the protective layer have a high thermal conductivity to enable it to function as a heat sink for purposes of rapid cooling of the active layer immediately following formation of the bumps. A thermal conductivity of at least $5 \times 10^{-4} \text{cal}/((\text{cm}^2/°\text{C.})(\text{sec/cm}))$ will provide adequate results. Suitable materials for use as a protective layer include silicone and acrylate.

A protective layer may or may not be required depending on the functionality, storage, and/or handling of the optical disk. Thus, in an application where the disk is stored and operated in a protective case or cartridge, a protective layer may not be required. A protective layer may also not be required where the reflective layer is of sufficient thickness so that the recordation bumps are not transmitted through the reflective layer to its outer surface.

In a preferred embodiment where rings 12 and 14 are present as a part of the protective layer, the width of the rings is between about 1 mm and 4 mm. The thickness of the inner and outer rings is selected in accordance with the desired thickness of the reflective layer 8.

FIGS. 3 and 4 illustrate the invention during/after the writing (either during the initial recording or during subsequent recordings) of recordation bump 16. To write, a laser beam (indicated by "hv") enters the substrate 4 and passes into the active layer 6 where it is absorbed at a particular wavelength, known as the "write" wavelength. The absorptive characteristics of the layer may be imparted thereto using methods that will be apparent to those of skill in the art, such as by the addition of light-absorptive dyes or pigments. Since the medium of the present invention need not be wavelength specific, a broad range of dyes or pigments is available for this purpose. In addition, except for the ability to pass a portion of the wavelength energy which is employed for the purpose of reading the recorded data, these dyes or pigments need not be wavelength-specific and may therefore absorb light energy over a broad spectrum of wavelengths. Thus, during recordation the laser beam is absorbed by a dye or a pigment contained within the active layer which will absorb light from the laser beam at the write wavelength to cause the active layer to expand away from the substrate and form recordation bump 16 extending into the reflective layer. Dyes or pigments that can be used singly or in combination are nigrosin blue, aniline blue, Calco Oil Blue, ultramarine blue, methylene blue chloride, savinal blue, Monastral Blue, Malachite Green Ozalate, Sudan Black BM, Tricon blue, Macrolex green G, DDCI-4, and IR26. Preferred among these are savinal blue, Tricon blue, Macrolex green G, and DDCI-4.

Because the absorption of the beam by the dye or pigment occurs progressively throughout the complete thickness of the active layer, a thermal gradient is created within the layer. This gradient depends on the amount of energy that is absorbed at a given depth within the layer. The incident surface of the active layer is necessarily heated to a higher temperature than its opposite surface, which results in a progressive absorption through the layer, and a thermal gradient is formed between the two surfaces.

The heated spot of the polymer active layer is confined by a surrounding low temperature area, and expansion can take place only away from the substrate. If a reflective layer is present, it will act as a passive component so that when a recordation bump is formed, the bump will protrude into the reflective layer and the reflective layer will conform around the bump. In addition to improving reflection, the metal reflective layer acts as a heat sink during recordation and causes the active layer to cool more rapidly at its opposite surface. If no reflective layer is present, as shown in FIG. 5, or if the reflective layer has a low reflectance, a recordation bump still will form, and the recording can be played back on a player designed to detect the deformation of the active layer without the high reflectance created by the reflective layer.

Whether or not a reflective layer is present, when the laser beam is turned off, the opposite surface of the active layer will cool much more rapidly than the incident surface, resulting in a temperature below the softening temperature of the polymer for the opposite surface. The opposite surface thus becomes rigid and locks the recordation bump into place while the hotter incident surface area is still expanded.

Additionally, formation of the recordation bumps is enhanced due to the viscoelastic forces within the polymer material of the active layer. During the record process, the material of the active layer heats to extremely high temperature quite rapidly This allows expansion forces to cause a bump to form. When the laser beam is turned off, the material cools rapidly due to the fact that it is surrounded by a cooler area of material. The resulting thermal conduction away from the heated area occurs more rapidly than the viscoelastic restoring forces of the material, and this contributes to locking the recordation bump into place.

After the optical medium has been recorded, as described above, erasure can be achieved by methods known in the art. For example, this may be accomplished by "spot" erasure, where either a different laser with a larger focused point, or the same laser used to record on the medium but defocused to a slightly larger spot, can be used to focus a light beam through the substrate 2 and the active layer 6. Erasure occurs when a recorded area of the active layer is heated relatively slowly to the softening temperature of the active layer and is then cooled slowly so that the active layer relaxes to its original unwritten state. By heating the active layer slowly, a steep temperature gradient is not formed through the thickness of the layer such as was formed during recordation. The cooling rate of the active layer is now slower than its viscoelastic restoring forces so that the polymeric material of the layer returns to its original spatial arrangement.

Unlike much of the prior art, there is no reason which requires that the write or recordation wavelength be different from the erasure wavelength. The write wavelength chosen can, and is preferred to be the same wavelength as used for erasure. The previous need for two lasers, to record and to erase, with different wavelengths corresponding to the absorption frequencies of different dyes in separate expansion and retention layers, is eliminated by the present invention.

Reading of the recorded data (bumps) from the optical disk is achieved by focusing a light beam, chosen from a wide spectrum of available light wavelengths, through the substrate 4 and through the active layer 6. Where a highly reflective layer 8 is present, that is, a layer with a reflectance of 70% or greater at the read wavelength, reading can be accomplished by a standard compact disk player read mechanism, with the recordation bumps generating interference with the reflected light beam and the interference then being detected by the read or playback system. If a reflective layer is not present or if the reflective layer has a low reflectance, the recording can be played back on a player designed to detect the deformation of the active layer without the high reflectance created by the reflective layer.

It is to be understood that the above description is intended to be illustrative and not restrictive. Many embodiments will be apparent to those ordinary of skill in the art upon reviewing the above description. By way of example, although the invention has been illustrated with reference to the use of lasers as the radiant energy source, other sources can be used and will be readily apparent to one of ordinary skill. The feature of a single active layer eliminating the need for an expansion layer and a retention layer can be combined with other arrangements of the substrate, reflective, and protective layers. The scope of the invention, therefore, should be determined with reference to the appended claims, along with the full scope of equivalents to which such claims are entitled, and should not be limited to the above description.

What is claimed is:

1. A recording medium, comprising:
   a) a substrate; and
   b) an active region, in which an optically detectable bump may be formed and erased, consisting of one layer adjacent the substrate, the active region exhibiting a thermal gradient and viscoelastic characteristics in the presence of radiation at an incident surface area at a write wavelength for forming said optically detectable bump upon exposure to a wavelength of light and for retaining the bump upon cessation of the wavelength of light without the need of an adjacent layer to hold the bump in place during cooling, a surface of the active region opposite the incident surface area cooling more rapidly than the incident surface area upon removal of said radiation to become rigid and lock the bump in place, thermal conduction away from the incident surface area upon removal of said radiation opposing viscoelastic restoring forces to contribute to locking the bump in place;
   wherein the active region has a softening temperature above 20° C.; and
   wherein the active region has a coefficient of expansion greater than $200 \times 10^{-6}/°C$.

2. A recording medium, comprising:
   a) a substrate;
   b) an active region in which an optically detectable bump may be formed or erased, the active region adjacent the substrate and exhibiting a thermal gradient and viscoelastic characteristics in the presence of radiation at a write wavelength for forming an optically detectable bump in the active region upon exposure to a wavelength of light at an incident surface area and for retaining the bump upon cessation of the wavelength of light without the need of an adjacent layer to hold the bump in place during cooling, a surface of the active region opposite the incident surface area cooling more rapidly than the incident surface area upon removal of said radiation to become rigid and lock the bump in place, thermal conduction away from the incident surface area upon removal of said radiation opposing viscoelastic restoring forces to contribute to locking the bump in place,
   c) a reflective layer adjacent the active region, the reflective layer being malleable for forming a deformation around the bump but with insufficient strength to hold the deformation when the active region returns to its original relaxed state; and
   d) a protective layer adjacent the reflective layer, the protective layer retaining the reflective layer against the active layer;
   wherein the active region has a softening temperature above 20° C.; and
   wherein the active region has a coefficient of expansion greater than $250 \times 10^{-6}/°C$.

3. A recording medium, comprising:
   a) a substrate; and
   b) an active region, in which an optically detectable bump may be formed and erased, consisting of one layer adjacent the substrate, the active region exhibiting a thermal gradient and viscoelastic characteristics in the presence of radiation at an incident surface area at a write wavelength for forming said optically detectable bump upon exposure to a wavelength of light and for retaining the bump upon cessation of the wavelength of light without the need of an adjacent layer to hold the bump in place during cooling, a surface of the active region opposite the incident surface area cooling more rapidly than the incident surface area upon removal of said radiation to become rigid and lock the bump in place, thermal conduction away from the incident surface area upon removal of said radiation opposing viscoelastic restoring forces to contribute to locking the bump in place;
   wherein the active region has a softening temperature above 20° C.; and
   wherein the active region has a coefficient of expansion greater than $300 \times 10^{-6}/°C$.

4. A recording medium, comprising:
   a) a substrate; and
   b) an active region, in which an optically detectable bump may be formed and erased, consisting of one layer adjacent the substrate, the active region exhibiting a thermal gradient and viscoelastic characteristics in the presence of radiation at an incident surface area at a write wavelength for forming said optically detectable bump upon exposure to a wavelength of light and for retaining the bump upon cessation of the wavelength of light without the need of an adjacent layer to hold the bump in place during cooling, a surface of the active region opposite the incident surface area cooling more rapidly than the incident surface area upon removal of said radiation to become rigid and lock the bump in place, thermal conduction away from the incident surface area upon removal of said radiation opposing viscoelastic restoring forces to contribute to locking the bump in place;
   wherein the active region has a softening temperature above 20° C.; and
   wherein the active region comprises a base resin selected from the group consisting of epoxys, polyurethane, polymers, amorphous polymers, cellulose acetate, cellulose acetate-butyrate, polystyrene, polysulfonamide, polycarbonate, cellulose nitrate, poly(ethyl-methacrylate), poly(vinyl butyryl), aromatic polyesters, polyamides, acrylic polymers, polyvinyl acetate, silicone resins, alkyd resins, styrene-butadiene copolymers, vinyl chloride-vinyl acetate copolymers, nitrocellulose, ethylcellulose, and mixtures thereof.

5. A recording medium, as recited in claim 4, wherein the base resin has a softening temperature in the range of about 80° C. to about 120° C.

6. A recording medium, as recited in claim 4, wherein the active region further comprises a curing agent.

7. A recording medium, as recited in claim 6, wherein the active region has a softening temperature in the range of about 80° C. to about 120° C.

8. A recording medium, as recited in claim 6, wherein the active region comprises a mixture of an approximately equal amount of a bisphenol A/epichlorohydrin resin and an epichlorohydrin-dimer fatty acid-based epoxy resin together with a nonstoichiometric amount of the curing agent.

9. A recording medium, as recited in claim 8, wherein the curing agent is an adduct of a polyamine with a dibasic fatty acid.

10. A recording medium, as recited in claim 6, wherein the active region comprises a mixture of a bisphenol A/epichlorohydrin resin together with a nonstoichiometric amount of an adduct of an aliphatic polyamine.

* * * * *